(12) United States Patent
Chen

(10) Patent No.: US 7,471,666 B2
(45) Date of Patent: Dec. 30, 2008

(54) MESSAGE-TYPE DATA COMMUNICATION APPARATUS USED IN A DECT SYSTEM

(75) Inventor: Yueh-Chang Chen, Hsinchu (TW)

(73) Assignee: Winbond Electronics Corporation, Hsinchu (TW)

( * ) Notice: Subject to any disclaimer, the term of this patent is extended or adjusted under 35 U.S.C. 154(b) by 1157 days.

(21) Appl. No.: 10/160,263

(22) Filed: Jun. 4, 2002

(65) Prior Publication Data

US 2003/0223412 A1 Dec. 4, 2003

(51) Int. Cl.
*H04B 7/212* (2006.01)
*H04J 3/00* (2006.01)
*H04M 1/00* (2006.01)

(52) U.S. Cl. ............... 370/347; 370/337; 455/554.2
(58) Field of Classification Search .............. None
See application file for complete search history.

(56) References Cited

U.S. PATENT DOCUMENTS 5,524,008 A * 6/1996 Levy ................. 370/337
5,659,698 A * 8/1997 Weng et al. .............. 711/220
6,185,637 B1 * 2/2001 Strongin et al. ............ 710/35
6,411,611 B1 * 6/2002 van der Tuijn ............ 370/337
6,466,554 B2 10/2002 Okada ..................... 370/312
6,473,814 B1 * 10/2002 Lyons et al. ............... 710/35
6,792,286 B1 * 9/2004 Bharath et al. .......... 455/554.2

* cited by examiner

*Primary Examiner*—Firmin Backer
*Assistant Examiner*—Clemence Han
(74) *Attorney, Agent, or Firm*—Rosenberg, Klein & Lee

(57) ABSTRACT

The present invention comprises a burst mode controller (BMC) having a slot control block, a CPU, a single-port data memory, a DMA controller and a control signal selector. When the slot control block sends a logic high enable signal to the control signal selector celecting meane within a first predetermined time slot, the BMC is enabled to transmit/receive message-type data to/from the signal port data memory. When the slot control block sends a logic low enable signal to the control signal selector within a predetermined second time slot, the DMA is enabled to access message-type data stored in the single-port data memory to a peripheral device in accordance with commands provided by the CPU.

17 Claims, 4 Drawing Sheets

MESSAGE-TYPE DATA COMMUNICATION APPARATUS USED IN A DECT SYSTEM

BACKGROUND OF THE INVENTION

1. Field of the Invention

The present invention relates to a digital communication system, and more particularly, to TDMA (Time Division Multiple Access) digital wireless communication system.

2. Description of the Prior Art

In digital wireless communication systems, it is often desirable for multiple (i.e. more than two) terminals to communicate with one another, all sharing a single frequency. One method of accomplishing this is commonly known as TDMA, or Time Division Multiple Access, whereby communications occur in a series of consecutive "frames". A frame is a prescribed block of time, (e.g. 10 milliseconds) during which each terminal is permitted to transmit and receive. All communications over the TDMA system are synchronized to the repetition rate of the series of frames. Each terminal is assigned one or more time-slots within a frame (a time slot is a portion of the duration of the frame) during which it may transmit or receive. Usually, a terminal is assigned at least two time slots: one time slot for transmitting and another time slot for receiving. After the completion of one frame, another frame begins, such that frames occur sequentially in time, and such that during each frame, each terminal has an opportunity to transmit and receive short "bursts" of data during its assigned time slots.

An example of a TDMA wireless system is known as the "DECT" (Digital Enhance Cordless Telecommunication) system. In the exemplary DECT system, twelve full duplex communication channels share a single frequency by dividing the transmission time into "Frames", "Slots", and "Bits". FIG. 1A depicts a time-line 100 having a generalized organization of frames and time slots of the DECT system. As a "previous" frame 110A (Frame N−1) ends, a "current" frame 110B (Frame N) commences. As the current frame 110B ends, a "next" frame 110C (Frame N+1) commences, etc. A DECT frame is 10 milliseconds long; it is further divided into 24 equal time slots (slot 0 to slot 23). Each time slot is further divided into 320 Bit-times. Each Bit-time is the time required to transmit one bit of digital information.

A sample protocol 120 for a time slot of FIG. 1A is shown in FIG. 1B, where protocol 120 dictates the information required to be transmitted during a single time slot. Protocol 120 may consist of a header 122, an A-field 124 and a B-field 126. The header 122 is provided for bit and frame synchronization and message-type identification. The A-field 124 is provided for transmitting control signals or less data. The B-field 126 is provided for carrying information during speech or data calls.

FIG. 2 is a schematic block diagram of a prior DECT system 200. When a user sends audio signal via a speaker/microphone 201, an analog-to-digital (A/D) converter 202 converts the audio signal into digitized bit streams. An ADPCM (adaptive differential pulse coded modulation) encoder/decoder 203 encodes the digitized bit streams, then transmitting the encoded data to a burst mode controller 204, and storing in a 1K×8 share RAM (random access memory) 205 of the burst mode controller 204. When the time slot allocated to the user begins, a Frame Packer/De-packer 206 accesses the encoded data stored in the share RAM 205, and packing the data into a packet of DECT specification. Then, the packet is transmitted to a portable as radio-frequency (RF) signal. When the portable transmits audio signal as RF signal to the DECT system 200, the process for transforming the RF signal to audio signal is in reverse.

In FIG. 2, an 8052 micron-controller 207 is used for monitoring the operation of the DECT system 200 and implementing high-level communication protocols and lower-level instructions for controlling the burst mode controller 204. As widespread of mobile phones, e.g. handset, the mobile phones is also used for transmitting message-type data, such as short message, except for telephone calls. In accordance with the block diagram of FIG. 2, only the 8052 micro-controller 207 can be used to transmit the message-type data. However, the micro-controller 207 is busy for implementing high-level communication protocols etc., and its speed is too slow. Thus, the micro-controller 207 cannot take over this task.

Accordingly, it is an intention to develop a message-type data communication apparatus suitable for a DECT system, which can alleviate the above issues and provide bi-directional data transfer with desired transmission rates.

SUMMARY OF THE INVENTION

It is one objective of the present invention to provide a message-type data communication apparatus used in a DECT (digital enhance cordless telecommunication) system, which provides an individual data path, separating from a voice path in the DECT system, to transmit/receive message-type data to/from a single-port data memory, without previously writing the message-type data in a buffer memory of a burst mode controller in the DECT system, and access the message-type data stored in the single-port data memory by the way of direct memory access to a peripheral device. Therefore, there is not any lateness occurring for the message-type data communication between the present apparatus and a portable. The architecture of the burst mode controller of the DECT system is remained, and still satisfying a DECT specification.

It is another objective of the present invention to provide a message-type data communication apparatus used in a DECT system, which utilizes a slot control block contained in a burst mode controller of the DECT system, a single-port data memory, and a direct memory access means to achieve bi-directional message-type data communication between the DECT system and a portable with a desired transmission rate.

It is a further objective of the present invention to provide a message-type data communication apparatus used in a DECT system, which utilizes a multiplexer and a single-port data memory to attain half-duplex hi-directional data communication between the DECT system and a portable.

It is still a further objective of the present invention to provide a DECT communication system, which provides an individual data path for message-type data communication without accessing a buffer memory of the burst mode controller in the DECT system. Therefore, the conflict for simultaneously accessing audio data and message-type data from the buffer memory is avoided.

In order to achieve the above objectives of this invention, the present invention provides a message-type data communication apparatus used in a DECT (digital enhance cordless telecommunication) system. The present apparatus comprises a burst mode controller having a slot control block, a central processing unit, a data memory, a direct memory access means and a control signal selecting means. The burst mode controller transmits or receives a burst of data including message-type data within an allocated time slot. The central processing unit provides control parameters of each time slot to the slot control block. The data memory writes in the message-type data received by the burst mode controller from a portable. The direct memory access means controlled by the central processing unit to directly access the message-type data stored in the data memory to a peripheral device. The control signal selecting means selectively provides control signals for the burst mode controller and the direct memory access means to the data memory. When the slot control block sends a logic high enable signal within a first predetermined time slot to the control signal selecting means, the burst mode controller is enabled to transmit/receive the message-type data to/from the data memory. When the slot control block sends a logic low enable signal within a second predetermined time slot to the control signal selecting means, the direct memory access means is enabled to access the message-type data stored in the data memory to the peripheral device in accordance with commands provided by the central processing unit.

BRIEF DESCRIPTION OF THE DRAWINGS

The objectives and features of the present invention as well as advantages thereof will become apparent from the following detailed description, considered in conjunction with the accompanying drawings.

DESCRIPTION OF THE PREFERRED EMBODIMENTS

Figure 1A:
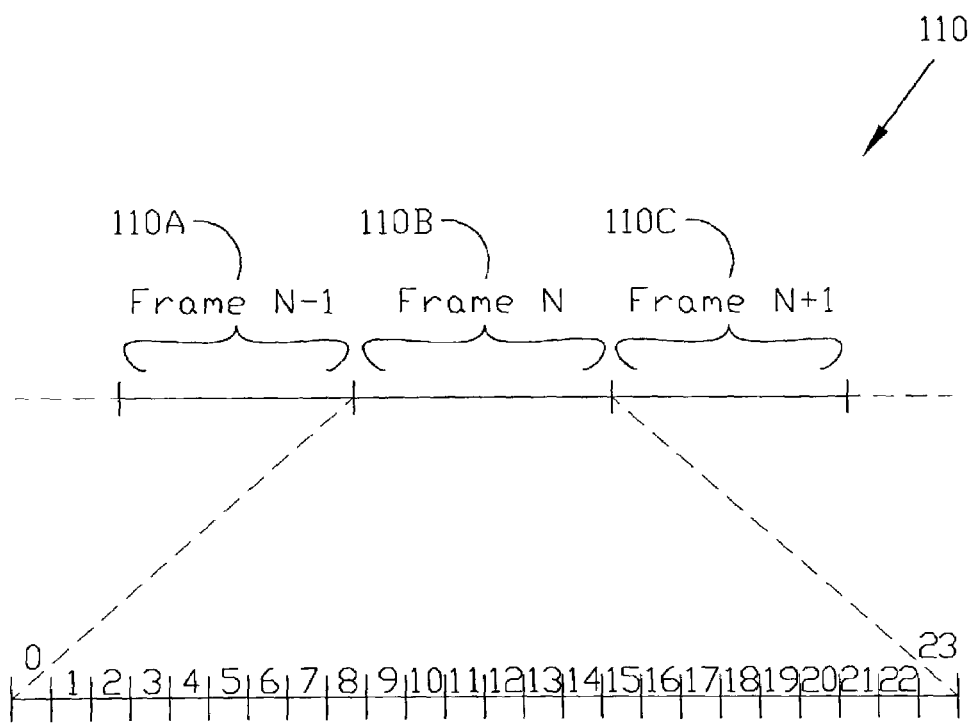
FIG. 1A is a time line diagram showing a generalized organization of a time slot within a frame for digital enhance cordless telecommunication.
Figure 1B:
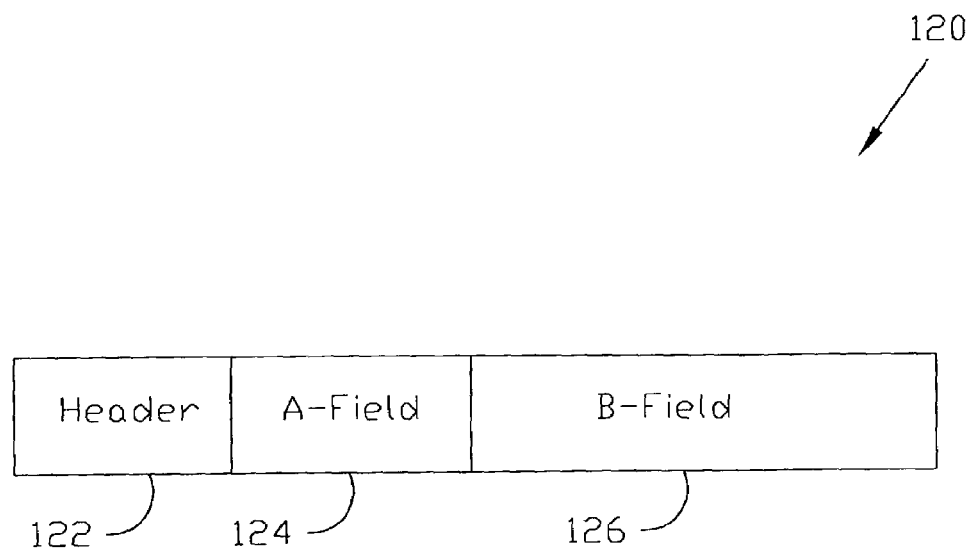
FIG. 1B is a sample protocol of a time slot within a frame for digital enhance cordless telecommunication.
Figure 2:
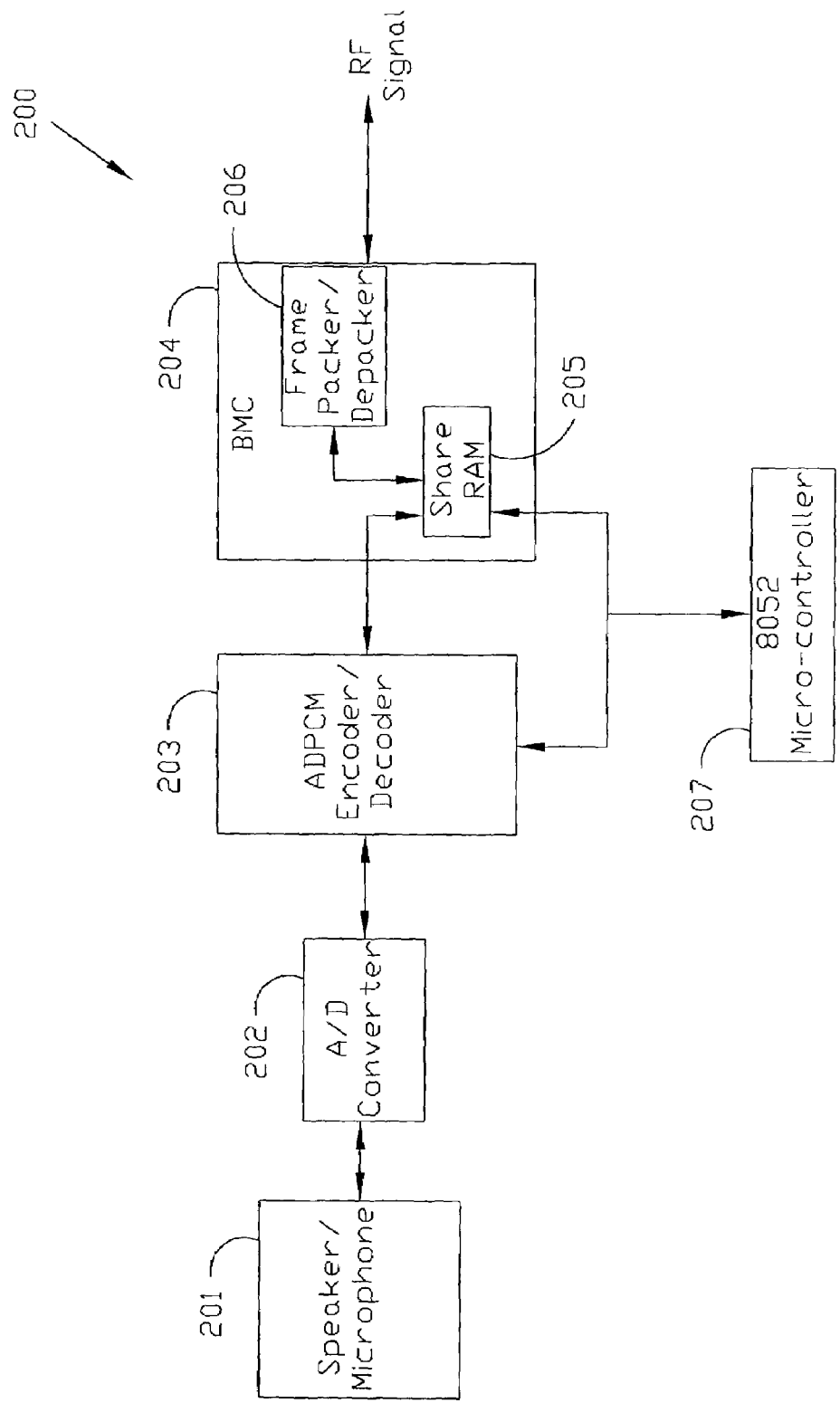
FIG. 2 is a schematic block diagram of a prior DECT system.

The present invention provides a message-type data communication apparatus used in a DECT system. The present apparatus provides an individual data path separating from a voice path of the DECT system for message-type data communication between the DECT system and a portable. The data path is constituted by a burst mode controller having a slot control block, a central processing unit, direct memory access (DMA) means, control signal selecting means and a single-port data memory. When the slot control block sends a logic high enable signal to the control signal selecting means within a predetermined time slot, the burst mode controller is enabled to transmit/receive message-type data to/from the single-port data memory. Upon the duration of this time slot, the direct memory access means is disabled, and cannot access data stored in the single-port data memory. When the slot control block sends a logic low enable signal to the control signal selecting means within another predetermined time slot, the direct memory access means is enabled to access message-type data stored in the single-port data memory to a peripheral device. Upon the duration of this time slot, the burst mode controller does not write message-type data into the single-port data memory, while can transmit/receive audio signal via the voice path of the DECT system. Therefore, the present apparatus can attain a half-duplex bi-directional data transfer between a portable and the DECT system except for telephone calls. The architecture of the burst mode controller of the DECT system is also remained, and satisfying the DECT standard specification. Thus, it is not necessary for a DECT system associated with the present apparatus to further vary the architecture of its burst mode controller.

The present invention will be described in detail in accordance with one preferred embodiment of the present invention with reference to the drawing of FIG. 3.

Figure 3:
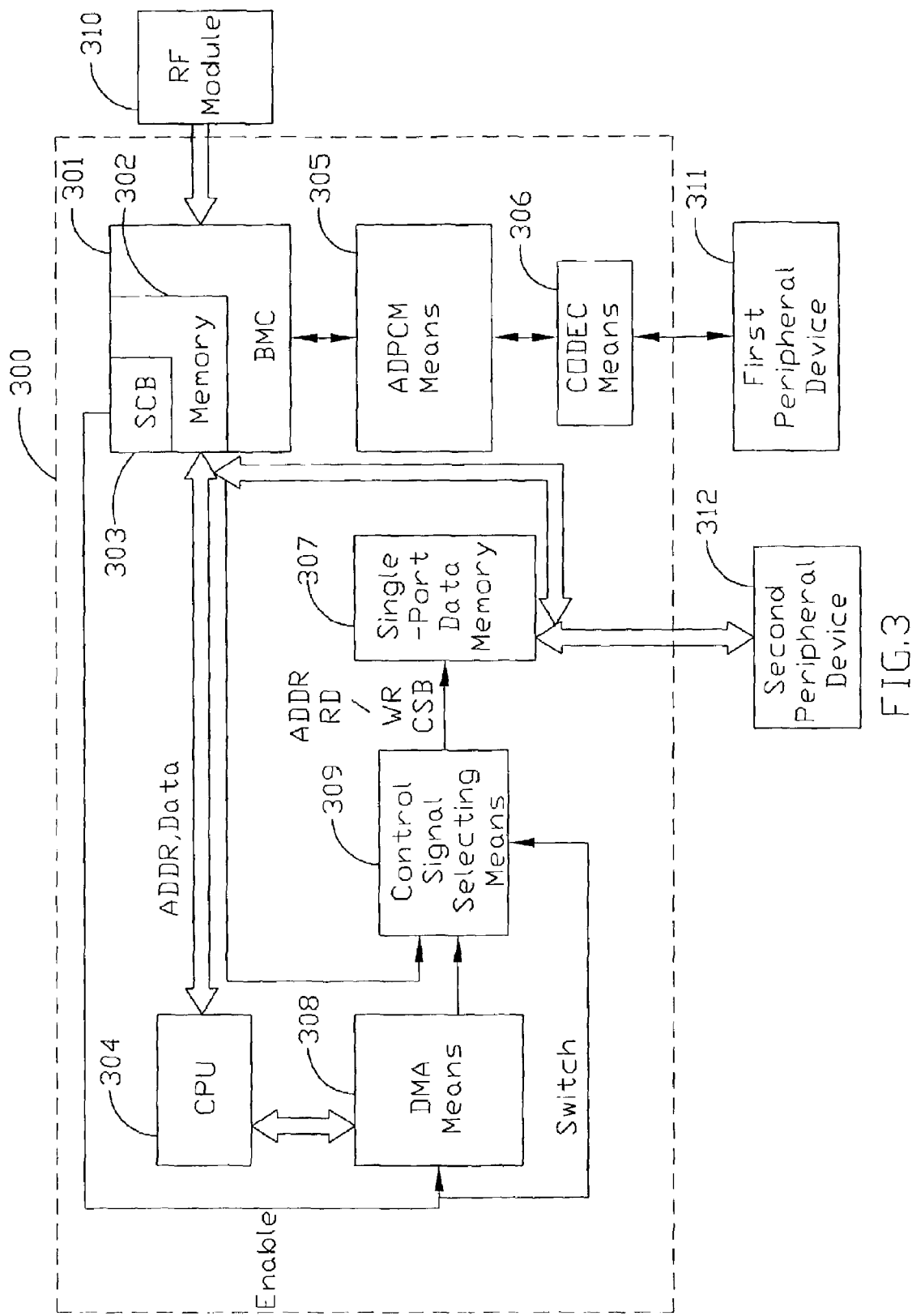
FIG. 3 is a schematic block diagram of a DECT system according to one preferred embodiment of the present invention.

FIG. 3 is a schematic block diagram of a DECT system 300 associated with one message-type data communication apparatus according to the preferred embodiment of the present invention. The DECT system 300 comprises a burst mode controller (BMC) 301 including a buffer memory 302 containing a slot control block (SCB) 303, a central processing unit 304, ADPCM (adaptive differential pulse code modulation) means 305, CODEC (coder-decoder) means 306, a single-port data memory 307, a direct memory access means 308, and a control signal selecting means 309. The burst mode controller 301, the buffer memory 302, the slot control block 303, ADPCM means 305 and CODEC 306 constitute the voice path, which follows the principle of a conventional DECT wireless communication system. While, the burst mode controller 301, the slot control block 303, the central processing unit 304, the direct memory access means 308, the control signal selecting means 309 and the single-port data memory 307 constitute the data path.

Referring to FIG. 3, the burst mode controller 301 is provided for creating various time slots and controlling the timing of the information within each of the time slots, and transmitting and receiving a bursted radio-frequency signal including audio data and message-type data within an allocated time slot. The buffer memory 302, such as a share random access memory, stores the audio data received by the burst mode controller 301 from a radio-frequency (RF) module 310. The central processing unit 304 is provided for preparing control parameters of each time slot and loading them to the slot control block 303. In forward direction, ADPCM (adaptive differential pulse code modulation) means 305 is provided for encoding the audio data from the burst mode controller 301 stored in the buffer memory 302 into digitized bit streams for transmitting to a first peripheral device 311, such as a speaker. In reverse direction, ADPCM means 305 decodes digitized bit streams from the first peripheral device 311 into audio data for transmitting to a portable as radio-frequency signal via the burst mode controller 301 and the RF module 310. CODEC means 306 is provided for converting the digitized bit streams from the ADPCM means 305 to the audio data for transmitting to the first peripheral device 311. And in reverse, to convert audio data from the first peripheral device 311 to digitized bit streams to be outputted to the ADPCM means 305 for transmitting to the portable as radio-frequency signal via the burst mode controller 301 and the RF module 310.

When the burst mode controller 301 receives message-type data from a portable via the RF module 310 withIn an allocated time slot, the message-type data is directly written in the single-port data memory 307, for example a single-port static random access memory. The direct memory access means 308 is provided for directly accessing the message-type data stored in the single-port data memory 307 to a second peripheral device 312, for example personal computer, printer and fax machine. The control signal selecting means 309, for example a multiplexer, is provided for selectively providing control signals for the burst mode controller 301 and the direct memory access means 308 to the single-port data memory 307.

The present invention inserts an "enable" bit in the slot control block 303. When the "enable" bit is logic high "1", representing the current time slot carries message-type data, not audio data. That is, when the slot control block 303 sends a logic high enable signal "1" to the control signal selecting means 309 within a predetermined time slot, the burst mode controller 301 is enabled, and the burst mode controller 301 obtains priority for accessing the single-port data memory 307. The central processing unit 304 sends commands including a starting address (ADDR) and data cycles (DATA) etc. to the burst mode controller 301. The control signals including a starting address (ADDR), read/write cycles (RD/WR) and CSB (chip select bar) of the single-port data memory 307 are switched to the burst mode controller 301. The burst mode controller 301 transmits/receives message-type data to/from the single-port data memory 307 within the predetermined time slot. Upon this current time slot, the direct memory access means 308 is disable.

When the slot control block 303 sends a logic low enable signal "0" to the control signal selecting means 309 within another predetermined time slot, the direct memory access means 308 is enabled. The direct memory access means 308 obtains priority for accessing the single-port data memory 307. The control signals including a starting address (ADDR), read/write cycles (RD/WR) and CSB (chip select bar) of the single-port data memory 307 are switched to the direct memory access means 308. The direct memory access means 308 directly accesses message-type data stored in the single-port data memory 307 to a second peripheral device 312, for example personal computer, printer and fax machine, in accordance with commands from the central processing unit 304, provided at off-line, within the predetermined time slot. Upon this current time slot, the burst mode controller 301 does not write in message-type data to the single-port data memory 307, but can transmit audio data between the DECT system 300 and the portable via the voice path.

Figure 4:
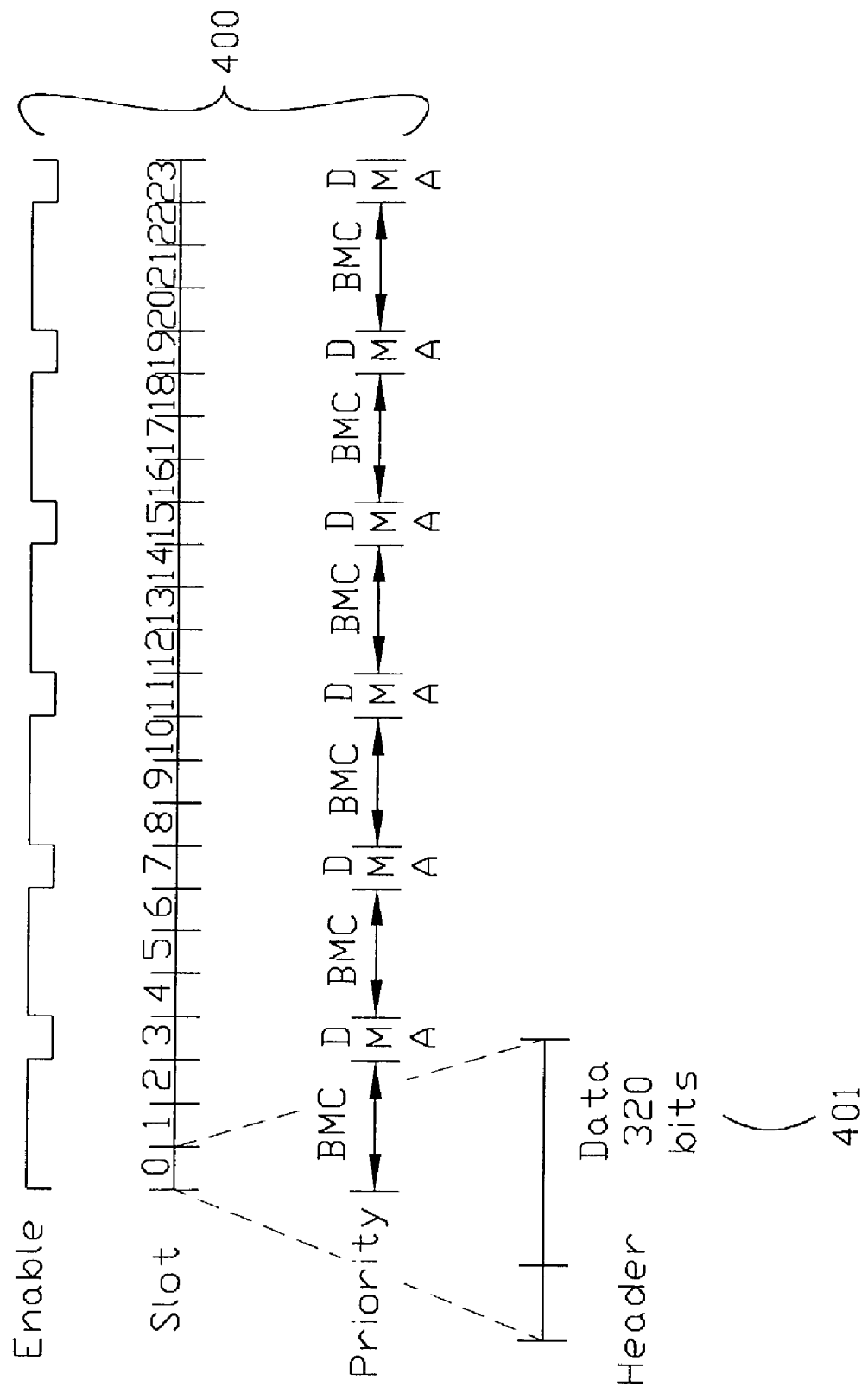
FIG. 4 is an exemplary timing diagram of time slots within a frame according to the preferred embodiment of the present invention.

FIG. 4 is an exemplary timing diagram 400 of time slots within a frame according to the preferred embodiment of the present invention. In case that, each 4 time slots within the frame, the burst mode controller 301 obtains priority for accessing the single-port data memory 307 within three consecutive time slots. The direct memory access means 308 obtains priority for accessing the single-port data memory 307 within a next time slot. The B-field 401 of each time slot with 320 bits is provided for carrying data. The duration of the frame is 10 milliseconds. Then, the data transmission rate of the present DECT system 300 is up to 320×24×¾×100=576 kbps. The IC (integrated circuit) of the DECT system 300 is operated at 13.824 MHz. Hence, for the direct memory access means 308, each time slot has 5787 cycles to access 320×⅜=120 bytes data stored in the single-port data memory 307.

In case that each 6 time slots within the frame, the burst mode controller 301 obtains priority for accessing the single-port data memory 307 within five consecutive time slots. The direct memory access means 308 obtains priority for accessing the single-port data memory 307 within a next time slot. The data transmission rate of the DECT system 300 is up to 320×24×⅝×100=640 kbps. Then, the direct memory access means 308 will access 320×⅝=200 bytes data stored in the single-port data memory 307 during 5787 cycles.

Therefore, the direct memory access means 308 of the present DECT system 300 has sufficient time to access data stored in the single-port data memory 307 in accordance with the principle of the present message-type data communication apparatus. Furthermore, the storage volume of the single-port data memory 307 can be determined depending on the data transmission rate of the DECT system 300. For example, when the data transmission rate is 576 kbps, the storage volume of the single-port data memory 307 can be 120 bytes. When the data transmission rate is 640 kbps, the storage volume of the single-port data memory 307 can be 200 bytes.

The embodiments are only used to illustrate the present invention, not intended to limit the scope thereof. Many modifications of the embodiments can be made without departing from the spirit of the present invention.

What is claimed is:

1. A message data communication apparatus used in a DECT (digital enhance cordless telecommunication) system, comprising:
   a burst mode controller having a slot control block, said burst mode controller receiving and transmitting a burst of data including message data within an allocated time slot;
   a data memory for storing the message data received by said burst mode controller;
   a direct memory access means used for directly accessing the message data stored in said data memory sending said message data to a peripheral device; and
   a control signal selecting means for selectively providing control signals received from said burst mode controller and said direct memory access means to said data memory;
   wherein when said slot control block sends a logic high enable signal within a first predetermined time slot to said control signal selecting means, said burst mode controller is enabled to transmit/receive the message data to/from said data memory, and when said slot control block sends a logic low enable signal within a second predetermined time slot to said control signal selecting means, said direct memory access means is enabled to access the message data stored in said data memory and send said message data to a peripheral device.

2. The message data communication apparatus of claim 1, futher comprising a central processing unit for providing control parameters of each time slot to said slot control block.

3. The message data communication apparatus of claim 2, wherein said central processing unit comprises a micro-controller.

4. The message data communication apparatus of claim 1, wherein said data memory is a single-port data memory.

5. The message data communication apparatus of claim 4, wherein said data memory comprises a single-port static random access memory.

6. The message data apparatus of claim 1, wherein a storage volume of said data memory is based on a data transmission rate of said apparatus.

7. The message data apparatus of claim 1, wherein said control signal selecting means comprises a multiplexer.

8. A DECT (digital enhance cordless telecommunication) communication system, comprising:
   a burst mode controller including a buffer memory containing a slot control block, said burst mode controller transmitting and receiving a bursted radio-frequency signal including audio data and message data within an allocated time slot, and said buffer memory storing the audio data;
   ADPCM (adaptive differential pulse code modulation) means for encoding the audio data from said burst mode controller stored in said buffer memory into digitized bit streams for transmitting to a first peripheral device, and in reverse to decode digitized bit streams from said first peripheral device into audio data for transmitting to a portable as radio-frequency signal via said burst mode controller;
   CODEC means for converting the digitized bit streams from said ADPCM means to the audio data for transmitting to said first peripheral device, and in reverse to convert audio data from said first peripheral device to digitized bit streams to be outputted to said ADPCM means for transmitting to the portable as radio-frequency signal via said burst mode controller;

a single-port data memory for storing the message data received by said burst mode controller;

a direct memory access means used for directly accessing the message data stored in said single-port data memory and sending said message data to the second peripheral device; and a control signal selecting means for selectively providing control signals received from said burst mode controller and said direct memory access means to said single-port data memory;

wherein when said slot control block sends a logic high enable signal within a first predetermined time slot to said control signal selecting means, said burst mode controller is enabled to transmit/receive the message data to/from said single-port data memory, and when said slot control block sends a logic low enable signal within a second predetermined time slot to said control signal selecting means, said direct memory access means is enabled to access the message data stored in said single-port data memory and send said message data to the second peripheral device.

9. The DECT communication system of claim 8, wherein said burst mode controller can transmit/receive audio data during said second predetermined time slot.

10. The DECT communication system of claim 8, wherein said buffer memory comprises a share random access memory.

11. The DECT communication system of claim 8, further comprising a central processing unit for providing control parameters of each time slot to said slot control block.

12. The DECT communication system of claim 11, wherein said direct memory access means is enabled to access the message data stored in said data memory to said second peripheral device in accordance with commands provided from said central processing unit.

13. The DECT communication system of claim 11, wherein said central processing unit comprises a micro-controller.

14. The DECT communication system of claim 8, wherein a storage volume of said single-port data memory is based on a data transmission rate of said DECT communication system.

15. The DECT communication system of claim 8, wherein said single-port data memory comprises a single-port static random access memory.

16. The DECT communication system of claim 15, wherein, storage volume of said single-port static random access memory is based on a data transmission rate of said DECT communication system.

17. The DECT communication system of claim 8, wherein said control signal selecting means comprises a multiplexer.

* * * * *